United States Patent [19]

Kido et al.

[11] 4,032,691

[45] June 28, 1977

[54] RECORDING MATERIAL

[75] Inventors: Keishirō Kido; Satoru Honjo; Masamichi Sato, all of Asaka, Japan

[73] Assignee: Fuji Photo Film Co., Ltd., Minami-ashigara, Japan

[22] Filed: Mar. 21, 1975

[21] Appl. No.: 560,770

[30] Foreign Application Priority Data

Mar. 22, 1974    Japan ............................. 49-32338

[52] U.S. Cl. ........................... 428/304; 428/320; 428/321; 428/411; 428/457; 428/500; 428/913; 346/76 R; 346/76 L
[51] Int. Cl.² ........................................... B32B 3/26
[58] Field of Search .................. 427/42, 43, 44, 53, 427/146, 150; 428/304, 316, 320, 322, 411, 537, 913, 914, 413–418, 423–425, 457, 458, 461, 463, 464, 474, 475, 476, 479–483, 500, 502, 503, 507–516, 518, 520, 522, 523, 532; 282/27.5; 346/76 L, 76 R

[56] References Cited

UNITED STATES PATENTS

| | | | |
|---|---|---|---|
| 3,236,717 | 2/1966 | Adhikary | 428/322 |
| 3,476,578 | 11/1969 | Brinckmann | 117/36.2 |
| 3,481,760 | 12/1969 | Clark et al. | 117/36.2 |
| 3,655,379 | 4/1972 | Gundlach | 96/27 |
| 3,682,763 | 8/1972 | Kubo et al. | 428/913 X |

*Primary Examiner*—Thomas J. Herbert, Jr.
*Assistant Examiner*—Bruce H. Hess
*Attorney, Agent, or Firm*—Sughrue, Rothwell, Mion, Zinn & Macpeak

[57] ABSTRACT

A recording material which comprises a support which is highly thermally insulating or a support having thereon a highly thermally insulating layer and a heat-sensitive layer which is thermally deformed, foams, colors, discolors, sublimes, evaporates, or becomes transparent, translucent or opaque when exposed to radiation having a high energy density such as a laser beam and an electron beam on the highly thermally insulating support or on the highly thermally insulating layer on the support.

3 Claims, No Drawings

RECORDING MATERIAL

BACKGROUND OF THE INVENTION

1. Field of the Invention

The present invention relates to a heat-sensitive recording material having a high sensitivity to record a light signal having a high energy density such as a laser beam and an electron beam and a method for producing same.

2. Description of the Prior Art

Heretofore, it is known, as a recording material for a light signal having a high energy density such as a laser beam and an electron beam, to use a recording layer of a metal, a dye, or a resin which is thermally deformed, that is, melted or evaporated, by thermal energy generated by the light exposure, in addition to a silver halide light-sensitive material. For instance, it is known to record a laser beam or an electron beam whose amplitude has been modulated by an electric signal on a recording material which is thermally deformable (e.g., as described in U.S. Pat. Nos. 3,262,122 and 3,266,393; A. L. Harris, M. Chen, H. L. Bernstein; *Image Technology*, pp. 31–35, April/May, 1970).

Such a recording method has the advantages of rapid processing and low cost and no post treatment is required.

However, since these recording materials have low sensitivity, a high power laser light source is necessary and the recording device is expensive and large.

It has now been found that a fairly large amount of the energy impinging on the recording layer does not contribute to increasing the temperature of the recording layer because the energy is lost since the thermal conduction from the recording layer to the support is fairly large.

SUMMARY OF THE INVENTION

Therefore, an object of the present invention is to provide a heat-sensitive recording material having high sensitivity.

Another object of the present invention is to provide a method for producing a heat-sensitive recording material.

The above-described objects of the present invention are attained with a heat-sensitive recording material which comprises a highly thermally insulating support or a support having thereon a highly thermally insulating layer and a heat-sensitive recording layer which is thermally deformed, foams, colors, discolors, sublimes, evaporates, or becomes transparent, translucent or opaque when exposed to radiation having a high energy density on the highly thermally insulating support or the highly thermally insulating layer.

Also, the above-described objects of the present invention are attained by coating a coating solution which comprises Component A and Component B on a support, drying the coated layer, and dissolving Component B away using an extracting Component C after providing a heat-sensitive recording layer on the coated layer, wherein Component A is soluble in the coating solvent and insoluble in the extracting Component C, and Component B is soluble in extracting Component C.

Furthermore, the above-described objects of the present invention are attained by forming a porous layer on a support and then forming a heat-sensitive recording layer on the porous layer.

DETAILED DESCRIPTION OF THE INVENTION

The recording material of the present invention fundamentally comprises a highly thermally insulating support or a support having thereon a highly thermally insulating layer and a heat-sensitive recording layer.

The support of the present invention preferably has a high melting point. Typical examples of suitable supports include a resin film or plate such as of polyvinyl chloride, polyethylene terephthalate, polyamide, polyimide, polycarbonate, polystyrene, cellulose acetate, cellulose acetate butyrate, cellulose acetate propionate, etc., paper or coated paper coated with inorganic materials such as baryta, silica, or clay or with a resin such as polyethylene or polypropylene; a metal plate such as of aluminum, copper, zinc and/or the like; a glass plate, a wooden board and/or the like. Some of these supports can be highly thermally insulating when they have been made into the same structure as that of the thermally insulating layer described below. When such a support having a thermally insulating structure is employed it is not necessary to provide any thermally insulating layer thereon, since the function of the layer is attained by the support itself. Some examples of these supports include a resin film or plate above-described.

The thermally insulating layer comprises a thermally conducting material such as a synthetic resin. Further the thermally insulating layer can have a fibrous structure, a porous structure, a honeycomb structure, a grid structure, or a kenzan structure to reduce the thermal conductivity of the layer. A more preferred structure for the thermally insulating layer is a structure in which the recording layer partially contacts the thermally insulating layer-forming substance at the interface of the recording layer and the thermally insulating layer. In other words, the thermally insulating layer has small pores at the layer surface, and the pores are not completely surrounded by the material which forms the thermally insulating layer but are partially integrated with the material which forms the recording layer.

The terms "highly thermally insulating" and "low thermally conductive" in this specification are employed in the same meaning. The thermal conductivity of the thermally insulating support or the thermally insulating layer is preferably less than 0.001 Joule/cm. sec. °K.

The reason why such a structure is suitable is not completely clear. However, it may be that the thermal insulation effect of the thermally insulating layer is increased since the area through which thermal energy such as a laser beam impinging on the recording layer is conducted is decreased, and that the area where the thermal deformation of the heat-sensitive recording layer is interfered with when the material (e.g., a metal, a dye, or a synthetic resin) which forms the recording layer is thermally deformed is decreased since the area where the recording layer and the thermally insulating layer are in contact is small.

Surprisingly, it was found that the sensitivity of the recording material can be increased by forming a layer having pores between the support and the recording layer as described immediately above. The heat-sensitive recording layer employed in the present invention can be continuous with or without pores or discontinuous by itself.

As already described, the heat-sensitive recording layer is provided on the highly thermally insulating support or layer. The recording layer is made of a material which is deformed, foams, colors, discolors, sublimes, evaporates, or becomes transparent, translucent or opaque when exposed to light having a high energy density such as a laser beam or an electron beam, on the highly thermally insulating support or the highly thermally insulating layer, so that an image recording is carried out by making the light exposed portions different from the non-exposed portions to form an image.

The heat-sensitive recording layer is provided by depositing a metal or a dye on the thermally insulating layer using vacuum deposition, sputtering, ion plating, chemical plating or the like, or by coating a synthetic resin layer using an immersion method, a roller coating method, lamination or the like. The suitable thickness of the layer is between 100 A to 10 microns, in particular 100 to 3000 A in the case of a metallic layer and a dye layer, and 0.1 to 10 microns in the case of a resin layer.

Suitable metals to be used in the present invention for the recording layer are lead, magnesium, aluminum, manganese, cobalt, nickel, palladium, copper, silver, gold, zinc, cadmium, indium, germanium, tin, bismuth, selenium, tellurium, gallium and a mixture thereof.

Suitable dyes to be used in the recording layer of the present invention are:

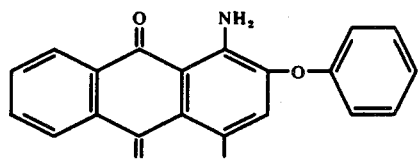

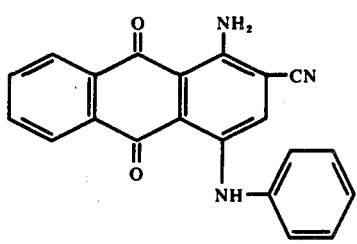

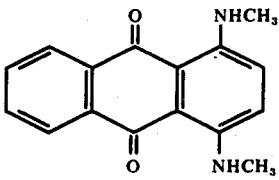

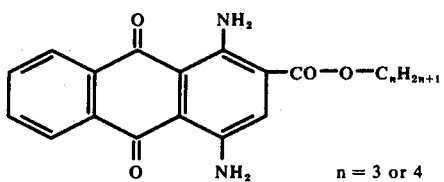

n = 3 or 4

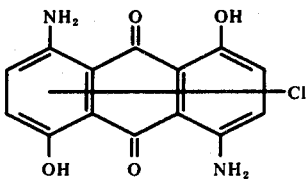

-continued

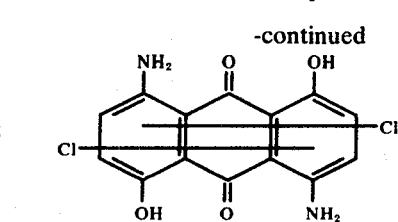

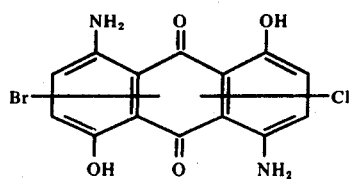

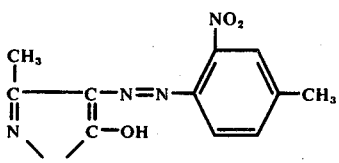

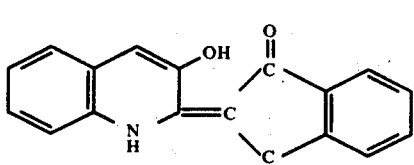

2-Hydroxy-6-methyl-4'-acetylaminoazobenzene

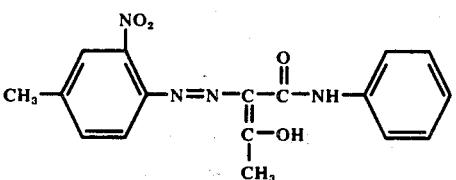

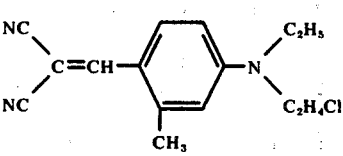

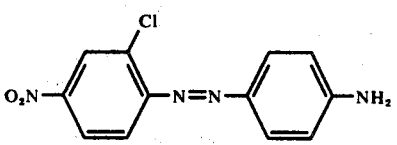

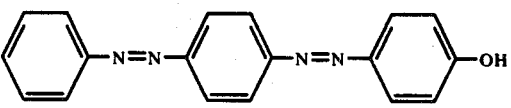

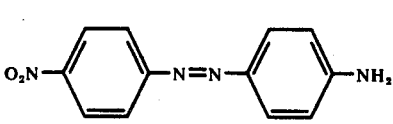

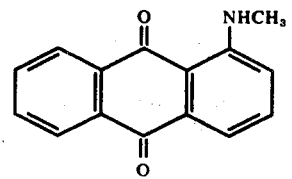

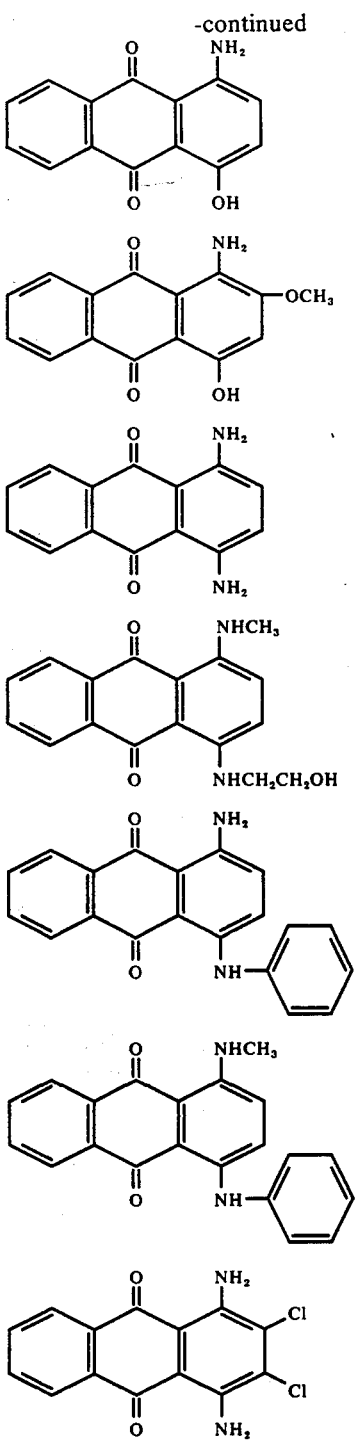

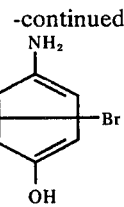

and so on.

Suitable synthetic resins which can be used in the present invention for the recording layer include nitrocellulose, ethyl cellulose, cellulose triacetate, polyvinyl chloride, polyesters, polystyrene, acrylic resins, alkyd resins, epoxy resins, and so on.

Methods for producing the recording material of the present invention which comprises a thermally insulating layer with cavities having a flat recording layer thereon are described hereinbelow.

One method includes forming a resinous binder layer in which a powder of a particle size of about 0.01 $\mu$ to about 10 $\mu$ is dispersed on a support and then providing a recording layer thereon using coating, vacuum deposition, laminating and the like. The powder used herein is made from a material which is soluble in a solvent which does not react with the support, binder and the recording layer. Then only the power is removed by dissolving out the powder before or after the recording layer is formed, thus a recording material comprising a thermally insulating layer with cavities is obtained.

According to another method of forming the thermally insulating layer, a material which can eventually provide pores by means of light, heat, or a combination of these treatments is dispersed in an appropriate binder, then the dispersion is coated on a support. For instance, a layer containing a thermo-volatile or a thermo-decomposable material is provided on a support, and then the material is removed from the layer by heating to form a thermally insulating layer. Examples of materials which decompose and generate a gas when exposed to light or heat include compounds containing at least two nitrogen atoms with a double bond or triple bond (e.g., azobisformamide, azobisisobutyronitrile, diazoaminobenzene; N-nitroso compounds such as N,N'-dimethyl-N,N'-dinitrosoterephthalamide, and N,N'-dinitrosopentamethylene tetramine, sulfonyl hydrazides such as benzenesulfonyl hydrazide, toluene-(4)-sulfonyl hydrazide and 4,4'-oxybis-(benzenesulfonyl hydrazide), etc.), and by application of light or heat a uniform foamed layer can be obtained to form a thermally insulating layer.

Additional methods for producing the thermally insulating layer are further described hereinafter. The resin which comprises the thermally insulating layer can be selected by considering swellability in selected solvents to be used in the process for introducing cavities (air bubbles). Combinations which can be easily carried out can be roughly divided into the following three groups, as described in Tables 1 and 2.

TABLE 1

| Combination | (A) Resins for the Thermally Insulating Layer | (B) Dispersed Phase (to be extracted later) | (C) Extracting Materials |
| --- | --- | --- | --- |
| 1 | Resins insoluble in aqueous extracting solutions but soluble in slightly polar organic solvents. | Inorganic pigments soluble in acid or alkali solutions. Resins or other (organic, inorganic) compounds soluble in polar organic solvents. | Acid or alkali aqueous solutions. Polar organic solvents. |
| 2 | Resins soluble in polar | Resins or other organic | Non-polar organic |

TABLE 1-continued

| Combination | (A) Resins for the Thermally Insulating Layer | (B) Dispersed Phase (to be extracted later) | (C) Extracting Materials |
|---|---|---|---|
|  | organic solvents but insoluble in non-polar organic solvents. | compounds soluble in non-polar organic solvents. | solvents. |
| 3 | Thermosetting resins which become insoluble in almost all solvents after heat-curing. | Resins or other compounds soluble in organic solvents. Compounds soluble in acid or alkali solutions. | Acid or alkali aqueous solutions. Organic solvents. |

TABLE 2

| Combination | (A) Resins for the Thermally Insulating Layer | (B) Dispersed Phase (to be extracted later) | (C) Extracting Materials |
|---|---|---|---|
| 1 | Polymethyl methacrylate, Vinyl chloride/vinyl acetate copolymer, Styrene/butadiene copolymer, Methyl methacrylate/vinyl acetate copolymer, Chlorinated rubber. | $CaCO_3$, $MgCO_3$, ZnO, CaO, Phenolic resins soluble in alcohols, Dioctyl phthalate, Acetanilide. | Aqueous solution of HCl or $CH_3COOH$, Ethyl alcohol, Methyl alcohol. |
| 2 | Vinyl acetate/crotonic acid copolymer, Ethylene/maleic anhydride copolymer, Polyvinyl butyral, Nylons soluble in alcohols, Ethyl cellulose, Linear polyester resins. | Polystyrene, Cumarone-indene resin, Polyisobutylene, Polybutene. | Isoparaffinic solvents, Cyclohexane. |
| 3 | Alkyd resins, Epoxy resins, Epoxy ester resins, Melamine/formaldehyde resins, Polyurethane. | Materials described in 1-(B) and 2-(B) above. | Materials described in 1-(C) and 2-(C). |

First, a mixture of (A) and (B) [(B) can be either dispersed or dissolved] is prepared using a solvent (coating solvent) for (A) to obtain a coating solution. The coating solution is coated on a support to form a first layer having a nearly flat surface. A recording layer is then provided on the first layer and finally both layers are treated with (C) to selectively extract (B) from the first layer. It is important that the recording layer should not prevent (C) from penetrating to the first layer. In fact, since most recording layers are very thin, solvent (C) can easily penetrate to the first layer.

As a process which can be easily conducted industrially and does not cause environmental pollution, a process which uses water as a coating solution and an extracting material can be used. This case corresponds to Combination 1 in the foregoing tables. A water-soluble compound is added to an oil-in-water emulsion which contains a water-insoluble resin which does not re-emulsify after film formation. In this case, (C) can be water. More specifically, the following materials can be used:

(A) for O/W emulsion

Styrene/butadiene copolymer; Polyvinyl acetate; Polyvinyl chloride; Vinyl chloride/vinyl acetate copolymer; Methyl methacrylate/butadiene copolymer.

(B)

Water-soluble polymer (e.g., polyvinyl alcohol, vinylalkyl ether/maleic anhydride copolymer, vinyl acetate/crotonic acid copolymer, casein, gelatin, albumin, CMC (carboxymethyl cellulose), sodium alginate, sodium polyacrylate, polyacrylic acid, etc.); Water-soluble inorganic salts (e.g., KCl, NaCl, and the like).

The ratio of (A) to (B) is selected so that the volume ratio of (A) to (A) + (B) is about 80:100 to about 20:100. If the volume ratio of (B) is too large, the recording layer becomes discontinuous or crumbles on extracting (B). A most suitable range of the volume ratio of (A) is from about 70 to 30%. When the mixing ratio of (A) to (B) is converted into a volume ratio, theoretically there is no void in the layer and air bubbles should be introduced first during the extracting process. However, in practice, in the layer of (A) and (B), the surface of (B) is not completely wetted and a void of about 10% may be present, if (B) is a pigment, a synthetic resin powder or the like. Therefore, the final void becomes larger than the value calculated by (B)/(A) + (B).

Further, as a method for introducing cavities in the layer before the recording layer is provided, the method as described immediately above can be carried out before the recording layer is formed, or one of the following methods can be utilized. That is:

i. As described in U.S. Pat. No. 2,739,909, an appropriate synthetic resin is dissolved, in an organic solvent, water is then emulsified in the solution, and then the emulsion is coated on a support. Then the solvent is first evaporated, afterward, water is evaporated to uniformly form air bubbles in the layer.

ii. A method utilizing the so-called phase separation phenomenon. This method can be divided broadly into two categories. In both of the categories, a resin to form the coating layer is dissolved in an appropriate solvent system, then the solution is coated on a support and dried. Here, the solvent composition is selected so that the system changes from a good solvent to a poor solvent during the drying process.

One of the methods uses a water-compatible good solvent having a high volatilizing rate. During drying, the temperature of the coated layer decreases due to removal of heat of vaporation, and the ambient water vapor condenses in the coated layer. As a result, the solvent composition loses its dissolving ability for the resin. That is, so-called "brushing phenomenon is utilized as described in U.S. Pat. No. 2,962,382; Japanese Patent Publication Nos. 5,106/1960 and 7,879/1960. Frequently used resins are nitrocellulose, ethyl cellulose, polymethyl methacrylate, and the like.

The other method uses a mixture of a poor solvent having a high boiling point and a good solvent having a low boiling point. As described immediately above, in the middle of the drying process the resin becomes insoluble and forms a cloudy film. This method is described in U.S. Pat. Nos. 3,020,172, 3,180,752, and 3,031,328.

The thermally insulating layer having pores is generally light scattering, however, the light transmittance of the layer can be increased as the layer becomes transparent with the application of heat at a temperature of about 80° C to about 180° C when the substance comprising the layer is thermoplastic. Consequently, by exposure to light such as a laser, the light transmittance of both the recording layer and the thermally insulating layer are increased, and the contrast of the light transmittance of the recorded image becomes large. Also, when the material comprising the thermally insulating layer is a thermosetting resin or a polymer such as nitrocellulose, the layer is not softened. Consequently, the light transmittance of the recorded areas can be suitably increased by post-treating such as lacquering.

The following examples are given to illustrate the present invention in greater detail. In the examples a vacuum evaporated film of bismuth was used as the recording layer, and a polyethylene terephthalate film at a thickness of 150 $\mu$ was used as a substrate. Recording was performed by exposing the recording layer to an argon laser beam of a wavelength of 4880 A, at a scanning speed of 19 m/sec and having a spot size of 18 $\mu$ at the surface of the recording layer. Recording materials with and without the thermally insulating layer were used, and the sensitivities were compared by comparing the threshold energy necessary to record each material. The threshold energy required to record on the recording material without the thermally insulating layer was $2.4 \times 10^5$ erg/cm$^2$. Further, all parts, percentages, ratios and the like are by weight unless otherwise indicated.

EXAMPLE 1

A mixture of 100 parts by weight of calcium carbonate (specific gravity: 2.7) having a particle size of about 2 microns, 30 parts by weight of a styrene-modified alkyd resin varnish (non-volatile component: 50% by weight; solvent: toluene; the composition of the varnish is not clear but it is believed that 50% by weight of the non-volatile component is styrene-modified dehydrocastor oil aliphatic acid), 100 parts by weight of toluene was blended in a ball mill. To the thus-obtained uniform dispersion was added 13 parts by weight of a polyisocyanate compound; a main component of the compound being a condensate of 3 moles of tolylene diisocyanate with one mole of trimethylol propane, varnish (non-volatile component: 75% by weight), and then the composition was coated on one surface of a polyethylene terephthalate film at a thickness of 150 $\mu$ to obtain a dry coating amount of 20 g/m$^2$. After the coated material was heated for 1 day at 50° C to finish the curing reaction, bismuth was vacuum deposited on the coated layer at a thickness of 500 A.

The thus-obtained film was then immersed in a 10% by weight aqueous solution of acetic acid to remove the calcium carbonate. After a sufficient immersion time, the film was removed from the solution, and then washed in water and dried.

The appearance of the thus-obtained bismuth layer showed no change as compared with the appearance before immersion.

The threshold energy required for recording this recording material using the argon laser beam was $6 \times 10^4$ erg/cm$^2$. Therefore, recording was conducted with an energy ¼ of that for the recording material without the thermally insulating layer, that is, the sensitivity was increased by a factor of 4.

EXAMPLE 2

Ethyl cellulose N-5, trade name, produced by Hercules Powder Corp., was used as a thermally insulating substance. Ethyl cellulose N-5 has an ethoxyl content of from 47.5 to 49.0%, but the molecular weight of this compound is unknown. A solution (5%) in the standard viscosity solvent (80:20 toluene: ethanol by weight mixture) at 25° C can be identified as having the viscosity of 5 centipoises. To 20 parts by weight of this polymer was added 40 parts by weight of zinc oxide powder having an average particle size of about 0.6 micron (specific gravity: 5.6), then the mixture was dissolved into a solvent mixture of 80 parts by volume of toluene and 20 parts by volume of ethyl alcohol. The thus-obtained coating solution was coated on a card paper, which is designed to produce a punched card having a high dimensional stability, treated with a melamine resin to obtain a dry coating amount of 12 ~ 15 g/m$^2$. After drying, bismuth was vacuum deposited on the layer at a thicknness of 500 A, and then the material was immersed in a 5N aqueous solution of hydrochloric acid to dissolve away the zinc oxide powder.

The threshold energy necessary to record the thus-obtained recording material with the argon laser beam was $6.5 \times 10^4$ erg/cm$^2$, that is, the sensitivity was increased by a factor of about 4.

EXAMPLE 3

A coating solution having the following ingredients was prepared.

|  | parts by weight |
|---|---|
| Nitrocellulose | 85 |
| Ethyl Cellulose N-10 (ethoxy content; 47.5-49%) (viscosity; 5) | 15 |
| Polymethyl Methacrylate | 3 |
| Acetone | 400 |
| Methanol | 150 |
| Toluene | 50 |
| Methyl Acetate | 200 |

The coating solution was coated on a polyethylene terephthalate film at a thickness of 150 $\mu$ in an atmosphere of a relative humidity of 70% and at 30° C. In the middle of the drying the layer became cloudy, and a light scattering layer at a thickness of about 7 $\mu$ was obtained. Bismuth was vacuum deposited on the layer.

The threshold energy required for recording the thus-obtained recording material using the argon laser beam was $9.4 \times 10^4$ erg/cm$^2$, that is, the sensitivity was increased by a factor of about 2.5.

EXAMPLE 4

A uniform dispersion was obtained by adding 100 parts by weight of a carboxystyrene/butadiene copolymer latex (Hycar 2570 × 5, trade name produced by Nippon Geon, non-volatile content: about 40%) to 20 parts by weight of a 10% by weight aqueous solution of polyvinyl alcohol. This dispersion was coated on a water-resistant paper to obtain a dry thickness of 10 $\mu$, and then the coated paper was heated at 70° C for 1 hour. Bismuth was vacuum deposited on this layer, then the material was immersed in water to dissolve the polyvinyl alcohol, and a thermally insulating layer was obtained.

The threshold energy required for recording this recording material using the argon laser beam was $6.9 \times 10^4$ erg/cm², that is, the sensitivity was increased by a factor of about 3.5.

While the invention has been described in detail and with reference to specific embodiments thereof, it will be apparent to one skilled in the art that various changes and modifications can be made therein without departing from the spirit and scope thereof.

What is claimed is:

1. A recording material which comprises a support having thereon a highly thermally insulating porous resin layer and a metal, dye or synthetic resin which is thermally deformed, foams, colors, discolors, sublimes, evaporates, or becomes transparent, translucent or opaque when exposed to radiation having a high energy density.

2. The material as claimed in claim 1, wherein said metal is lead, magnesium, aluminum, manganese, cobalt, nickel, palladium, copper, silver, gold, zinc, cadmium, indium, germanium, tin, bismuth, selenium, tellurium, gallium, or a mixture thereof.

3. The recording material of claim 1, wherein said highly thermally insulating layer has a thermal conductivity of less than 0.001 Joule/cm.sec.K°.

* * * * *